United States Patent Office 2,839,481
Patented June 17, 1958

2,839,481

COMBINATIONS OF KETONE FORMALDEHYDE REACTION PRODUCTS AND GLYCIDYL ETHER OF POLYHYDRIC PHENOLS OR POLYHYDRIC ALCOHOLS

Mortimer T. Harvey, South Orange, and Peter L. Rosamilia, Newark, N. J., assignors to Harvel Research Corporation, Irvington, N. J., a corporation of New Jersey No Drawing. Application February 28, 1958
Serial No. 718,138

22 Claims. (Cl. 260—19)

This invention relates to novel compositions of matter and to methods for preparing them and also to novel articles of manufacture of which said compositions are components. In one of its more specific aspects this invention is directed to novel resinous organic reaction masses.

The novel products of this invention find particular application as coating materials for wood, metals, paper, cotton, linen, silk, nylon, dacron, cellulose triacetals, glass fiber and other fabrics and for electrical insulation; also as binders and coatings for abrasives as, for example, in the arts of sand paper, grinding wheels and the like; and also as binders for asbestos and asbestos-barytes-talc, etc., used in the field of friction elements for the production of brake linings and clutch facings, for example, also for drum and can coatings.

We have discovered that novel products of this invention may be produced by combining Material A which is liquid at a temperature below 300° F. and which is one or a combination of two or more ketone-formaldehyde reaction products produced by reacting formaldehyde, or its equivalent paraformaldehyde, trioxane, with one or a combination of two or more ketones, examples of which are acetone, methyl ethyl ketone, methyl isobutyl ketone, cyclohexanone, acetonyl acetone, diacetone alcohol, etc., said ketones having at least two hydrogen atoms on an alpha carbon, with Material B which is liquid at a temperature below 350° F. and which is one or a combination of two or more glycidyl ethers of a compound selected from the group consisting of polyhydric alcohol and polyhydric phenols, and with or without Material C which is one or a combination of two or more phenol-aldehyde resins, and/or with or without Material D which is one or more aldehyde-reactive polyhydric phenols.

Such combinations of Materials A and B when cured are more flexible, exhibit better adhesion to metal, and have greater chemical resistance than do such Materials B alone when cured. The presence of Materials C in such combinations speeds the cure and in addition, in some cases, imparts flexibility.

The ratio by weight of Material A to Material B may vary over wide limits depending upon what is required. In general, however, said ratio is 100 parts of one or a combination of two or more Materials A to 5–2000 parts of one or a combination of two or more Materials B; and when Material C is employed, we prefer to use 5–50 parts by weight of Material C to each 100 parts of the combined weights of Materials A and B employed. By combining Material A with Material B, the presence of Material A increases the heat resistance of Material B when such combinations are cured and also prevents crystallization and cracking at elevated temperatures which occurs with cured Material B alone. The curing of such combinations of Material A and Material B may take place by employing in said combination a curing agent capable of curing the Material B. Examples of some of such agents preferably employed for certain purposes are (a) amines and (b) polybasic carboxylic acids and mixtures of a and b and their equivalents.

The Materials B preferably employed in the practice of this invention are glycidyl polyethers of polyhydric phenols and/or polyhydric aliphatic alcohols and they may be in either the monomeric and/or polymeric states, and with said glycidyl polyethers preferably having an epoxide equivalency greater than 1. The glycidyl polyethers of the polyhydric phenols are those of either mononuclear or polynuclear phenols.

Material C is a phenol-aldehyde resinous reaction product which is liquid at 100° C. and preferably of the thermosetting type.

Said glycidyl polyethers of the aliphatic polyhydric alcohols are obtainable by practicing the methods known to the art, an example of which is to react such alcohol with epichlorhydrin or glycerol dichlorhydrin in the presence of a suitable acidic catalyst, such as boron trifluoride and then converting said reaction product to the polyepoxide by employing suitable alkaline agents, such as sodium hydroxide, sodium aluminate, etc. Examples of some of said glycidyl polyethers are those of such alcohols as diethylene glycol, propylene glycol, glycerol, etc., and all of which have a 1,2-epoxide equivalency greater than 1.

The glycidyl polyethers of polyhydric phenols are obtainable by reacting a polyhydric phenol with epichlorhydrin in basic medium at about 50° C. to 150° C. with use of more than 1 mole of epichlorhydrin per equivalent of phenolic hydroxyl group of the phenol and a slight stoichiometric excess of base such as about 2% to 3% excess sodium or potassium hydroxide. The reaction is effected by heating for several hours and the product is then separated from formed salt, excess base, and any unreacted epichlorhydrin. It is usually preferred to employ glycidyl polyether of a dihydric phenol in the invention, which product, instead of being a single simple compound, is generally a complex mixture of glycidyl polyethers, but the principal product may be represented by the formula:

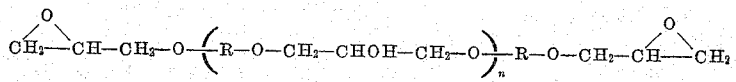

wherein $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form, and therefore, the 1,2-epoxy equivalency approaches, but is not equal to 2.0; it is a value between 1.0 and 2.0.

The simplest of the polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain, which are linked together by intervening ethereal oxygen atoms.

The 1,2-epoxy equivalency of the glycidyl polyether refers to the number of 1,2-epoxy groups

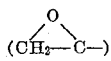

contained in the average molecule of the polyether. The 1,2-epoxy equivalency is thus dependent upon the molecular weight and the epoxide value which is measured as gram equivalents of epoxide per 100 grams of polyether. The 1,2-epoxide value is determined by heating a weighed sample of polyether with an excess of 0.2 N-pyridinium chloride in chloroform solution at the boiling point under reflux for two hours whereby the pyridinium chloride hydrochlorinates the epoxy groups to chlorhydrin groups. After cooling, the excess unreacted pyridinium chloride is back titrated with 0.1 N-sodium hydroxide in methanol to the phenolphthalein end point. The epoxide value is calculated by considering one HCl as equivalent to one epoxide group. This method is used for obtaining all epoxide value discussed herein.

Any of the various polyhydric phenols used in preparing the polyethers include mononuclear phenols such as resorcinol, catechol, hydroquinone, methyl resorcinal, etc.; or polynuclear phenols like 2,2-bis(4-hydroxyphenol) propane which is termed bis-phenol A herein for convenience, 4,4-dihydroxy-benzophenone, bis - (4-hydroxyphenyl)-methane, 1,1-bis(4-hydroxyphenol)-ethane, 1,1-bis(4-hydroxyphenyl) isobutane, 2,2-bis(4-hydroxyphenol) butane, 2,2-bis(4-hydroxy-2-methylphenyl) propane, 2,2-bis(4-hydroxy-2-tertiary butylphenyl) propane, 2,2-bis(2-hydroxy naphthyl) pentane, 1,5-dihydroxynaphthalene, etc., as well as more complex polyhydric phenols such as pyrogallol, phloroglucinol, and novolac resins from condensation of a phenol with an aldehyde in the presence of an acidic condensation catalyst. Preparation of glycidyl polyether of novolac resin is described in Example 27 of German Patent No. 676,117.

Other examples of such glycidyl polyethers of bisphenols are those obtainable by reacting epichlorhydrin in a basic medium with the organic reaction products produced by reacting a material selected from the class consisting of hydroxy benzene, naphthol, anthranol and their homologues with a phenol having an unsaturated hydrocarbon substituent, with such reaction products being shown in the U. S. patent to M. T. Harvey, No. 2,317,607, issued April 27, 1943, and glycidyl polyether of certain of said reaction products being shown in U. S. patent to D. Wasserman, No. 2,665,266. Still other examples of said glycidyl polyethers of bis phenols are those which may be derived from any of the other bis-phenols produced according to said Harvey patent. Such bis-phenols may be reacted with epichlorhydrin in the presence of an alkali employing in general the procedure set forth in the aforesaid Wasserman patent to produce the glycidyl polyethers of said other bis-phenols.

Examples of some of such Materials A which may be employed in the practice of this invention are the well known ketone-formaldehyde organic reaction products, some of which are disclosed in U. S. patent to M. T. Harvey, issued on July 6, 1954, as No. 2,683,133, and especially the water-soluble acetone-formaldehyde organic reaction products disclosed therein in Examples 2 and 3.

The following Examples A–I–A–XXXII are other illustrative examples of methods which may be employed for the preparation of other illustrative Materials A useful in the practice of this invention, all given by way of illustration and not limitation, all parts given by weight unless otherwise specified.

EXAMPLE A–I 60 lbs. of acetone
340 lbs. of formaldehyde (37% conc.)
2 lbs. of diethylaminopropyl amine were charged into a reaction unit provided with a reflux condenser and mixed together. While being constantly stirred, the mass was externally heated whereby exothermic reaction took place. When the temperature of the mass reached about 135° C. the external source of heat was removed and the exothermic reaction was allowed to continue whereupon the temperature of the mass increased and then began to drop. When the temperature of the mass begins to drop there is added an additional 60 lbs. of acetone and an additional 2 lbs. of diethylaminopropyl amine whereupon the exothermic reaction again takes place and is allowed to continue. After the exothermic reaction has terminated, the mass is externally heated to maintain said mass in the state of boiling under said condenser for about 30 minutes. Then the condenser is removed and the mass is dehydrated under vacuum of about 10 to 15 mm. of mercury pressure to a temperature of 150° F. and then is strained. The strained mass is a substantially anhydrous liquid acetone-formaldehyde reaction product hereinafter known as Product A–I.

EXAMPLE A–II 300 lbs. of acetone
1700 lbs. of formaldehyde (37% conc.)
22 lbs. of NaOH in
60 lbs. of water The caustic soda-water solution was divided into four equal portions. The unit was loaded with acetone and formaldehyde with the steam on and stirring equipment in operation and the material was heated to 120–125° F. The first portion of caustic soda-water solution was added and the steam cut off. As the temperature rises to 130° F. and the cold water is turned on, an exothermic reaction takes place and the temperature slowly rises to 200° F. then slowly begins to fall. At 185° F. the second portion of caustic soda-water solution is added whereupon the temperature again rises to 200° F. Upon cooling to 185° F. the procedure is repeated allowing the temperature to rise and fall between the additions of caustic soda-water solution and keeping the cold water on the jacket at all times. The mass is then allowed to cool to 145° F. at which time the cold water is shut off. Vacuum is turned on, keeping the vent open. The vent is slowly closed and the steam turned on, and dehydration is continued to produce a substantially anhydrous acetone-formaldehyde resinous reaction product which was an amber colored liquid known hereinafter as Product A–II.

EXAMPLE A–III

Using the same components in the same proportions as those set forth in Example A–II and employing said method of Example A–II, except that the dehydration is continued until an aqueous solution of the acetone-formaldehyde resinous reaction product is obtained which solution contains 80% by weight of said acetone-formaldehyde reaction product. 2400 lbs. of such solution is charged into a reaction vessel and the temperature thereof is raised and maintained in the range of 130–140° F. while being constantly agitated by means of a high speed stirrer and maintained within said temperature range, there is added thereto a slurry consisting of 44 lbs. of sodium sulphite in 88 lbs. of water. After all of the slurry has been added the vacuum is turned on the reaction unit whereby the mass is maintained at a pressure of 40 mm.–50 mm. of mercury and the temperature is increased until it reaches approximately 200° F. to substantially completely dehydrate the reaction mass. Then under atmospheric pressure conditions, the mass is heated to about 250° F. and maintained at said temperature until the viscosity thereof measures approximately 10,000 cps. at 25° C. This substantially completely dehydrated heavy viscous liquid is hereinafter known as Product A–III.

EXAMPLE A–IV 720 parts of methyl ethyl ketone
1700 parts of aqueous formaldehyde (37%)
68 parts of sodium hydroxide in
135 parts of water The ketone and aqueous solution of formaldehyde were charged into a reaction vessel having a reflux condenser connected thereto and a stirrer therein. While the mixture is being constantly stirred, there is added thereto about ¼ of said aqueous solution of caustic soda whereupon an exothermic reaction takes place and the reacting mass is permitted to attain a temperature in the range of about 90–105° C., and then is cooled to about 50–60° C. Then another ¼ of said aqueous solution of caustic soda is added to the mass which again causes an exothermic reaction to take place and again the reacting mass is permitted to attain a temperature in the range of 90–95° C. and again is cooled to about 50–60° C. The third and fourth quarters of the aqueous solution of caustic soda are respectively added and the same procedure as before started is employed. After the addition of the last ¼ of caustic soda solution, permitting the reaction to rise to 90–105° C., the entire mass is then externally heated to boiling and maintained in the state of boiling under said reflux condenser for about 1 hour. Then the mass is neutralized with dilute hydrochloric acid and the resulting salt solution is removed. The neutralized mass is water-washed to remove residual salt and then is dehydrated under vacuum of 20 mm. of mercury pressure while being heated to about 110° C. The resultant substantially dehydrated ketone-formaldehyde reaction product is a hard brittle, amber colored resin having a molecular weight of approximately 500 and 4% hydroxyl content and is hereinafter known as Product A–IV.

EXAMPLE A–V 200 parts of methyl isobutyl ketone
340 parts of formaldehyde (37% conc.)

were charged into a reaction vessel provided with a reflux condenser and stirrer. In a second container there was prepared a solution consisting of 25 parts of sodium hydroxide in 50 parts of water. While the mass in said reaction unit is being constantly stirred, there is added thereto 25 parts of said aqueous solution of sodium hydroxide, the mass was heated whereupon an exothermic reaction took place and the mass attained a temperature of approximately 200° F. whereupon it was cooled to about 150° F. At this stage, as before, the last 25 parts of said aqueous solution of sodium hydroxide was added to the mass, on the application of heat the exothermic reaction took place and the temperature of the mass reached approximately 200° F. Then, when the temperature of the mass began to drop, the mass was externally heated and maintained at a temperature of about 195° F. for approximately 2 hours. Then the mass was neutralized with dilute solution of sulfuric acid and water washed to remove salts and was subsequently dehydrated under vacuum of 20 mm. of mercury pressure while heated to a temperature of about 295° F. The resultant mass measured approximately 247 parts, is a light colored low viscosity resinous liquid. A 100 g. sample of said liquid after being maintained for 24 hours at 350° F. measured 60 grams. This product is known hereinafter as Product A–V.

EXAMPLE A–VI 200 grams of cyclohexanone
340 grams of formaldehyde (37% conc.)

were charged into a reaction vessel provided with reflux condenser and stirrer. While being constantly stirred, there was added thereto 7.8 parts of an aqueous solution of sodium hydroxide prepared by dissolving 10 parts of sodium hydroxide in 20 parts of water. This mixture was heated whereupon an exothermic reaction occurred which was very vigorous and is allowed to proceed with the external source of heat removed, until a temperature of approximately 210° F. is reached whereupon it is cooled to approximately 140° F. At this stage the remaining 22.5 parts of aqueous sodium hydroxide solution is added to said mass and an exothermic reaction takes place and is allowed to proceed whereupon the temperature of the mass increases. When the temperature begins to drop, external heat was applied and the mass was maintained at 205–215° F. for one hour. Then it was neutralized with dilute sulfuric acid, washed and dehydrated at 20–25 mm. of mercury pressure to 250° F. to obtain a solid substantially completely dehydrated resin hereinafter known as Product A–VI.

EXAMPLE A–VII 100 lbs. of mesityl oxide
340 lbs. of formaldehyde (37% conc.)

were charged into a reaction vessel provided with a reflux condenser and a high speed agitator. In a separate vessel there is prepared a solution consisting of 11 lbs. sodium hydroxide dissolved in 22 lbs. of water. While said mixture of mesityl oxide and formaldehyde is being constantly stirred, there is added thereto 16½ lbs. of the aqueous solution of sodium hydroxide whereupon an exothermic reaction takes place and the temperature of the mass is allowed to rise to about 200° F. At this stage the mass is cooled to 150° F. and then 8¼ lbs. of aqueous solution of sodium hydroxide is added thereto and again the exothermic reaction is allowed to proceed until the temperature of the mass reaches approximately 200° F. The mass is again cooled to about 150° F. and the remaining 8¼ lbs. of aqueous solution of sodium hydroxide is added and when the exothermic reaction has subsided, the mass is maintained at about 200° F. by the employment of external heat for approximately ½ hour. Dilute sulphuric acid is added thereto to neutralize the mass, the stirring is discontinued and the resin is allowed to settle to the bottom of the reaction vessel. The aqueous upper layer is decanted and the mass is then washed with an equal volume of water with stirring to wash out the salts. Then the mass is dehydrated by heating to a temperature of approximately 140° C. to provide a substantially anhydrous solid resin measuring about 165 lbs. and is known hereinafter as Product A–VIII.

EXAMPLE A–VIII 1140 parts of acetonyl acetone
340 parts of formaldehyde (37% conc.)

where charged into a reaction vessel provided with stirrer and reflux condenser. In a separate container there was prepared an aqueous solution of caustic soda consisting of 30 parts of NaOH and 60 parts of water. Then the same procedure as that of Example A–I was employed to provide a substantially solid resinous reaction product hereinafter known as Material A–VIII.

EXAMPLE A–IX 1700 parts of aqueous solution of formaldehyde (37% conc.)
600 parts of acetone
25 parts of triethylamine The three components are mixed together and warmed gently to accelerate the exothermic reaction which ensues and is allowed to continue under a reflux condenser after the external source of heat has been removed. When exothermic reaction subsides, external heat is again applied to maintain the mass in the state of boiling under the condenser for ½ hour. The condenser is then removed and the mass is heated to about 130° C. to dehydrate. The resultant substantially anhydrous acetone-formaldehyde liquid reaction product is of a resinous nature, is straw colored and is hereinafter known as Product A–IX and measured about 950 parts containing 0.75% nitrogen.

EXAMPLE A–X

Employing the same components in the respective amounts set forth in Example A–IX and employing the procedure as therein set forth except that the acid number of the formaldehyde solution has first been ascertained and then sufficient sodium carbonate is added thereto to reduce the acid number thereof to zero. The resultant substantially anhydrous acetone-formaldehyde reaction product is of a resinous nature, is straw colored and is hereinafter known as Product A–X and measured about 950 parts.

EXAMPLE A–XI

To 1700 parts of aqueous solution of formaldehyde (37%) is added a solution of 315 parts of acetone together with 25 parts of triethylamine. Under reflux condenser, the mass is warmed gently to accelerate the exothermic reaction. After the exothermic reaction has subsided, a solution of 315 parts of acetone together with 25 parts of triethylamine is added thereto. By the use of external heat the mass is maintained in the state of boiling under said condenser for 30 minutes. Then the mass is heated to about 130° C. to substantially completely dehydrate it. The yield is 973 parts of substantially anhydrous liquid acetone-formaldehyde reaction product which is of a resinous nature, straw colored and is hereinafter known as Product A–XI.

EXAMPLE A–XII 510 parts of aqueous solution formaldehyde (37% conc.)
360 parts of acetone
75 parts of diethylamino propyl amine The above components were mixed and placed under a reflux condenser and allowed to stand at room temperature (70° F.) whereupon an exothermic reaction occurred and the temperature of the mass reached 76° C. The mass was allowed to react for about 1½ hours, the condenser removed and then the mass was maintained, under reduced pressure of 70 mm. of mercury pressure, at a temperature of 95° C. until it was substantially completely dehydrated. This yielded 342 parts of substantially anhydrous liquid acetone-formaldehyde reaction product which was of a resinous nature, was straw colored and is hereinafter known as Product A–XII.

EXAMPLE A–XIII 510 parts of aqueous solution of formaldehyde (37% conc.)
180 parts of acetone
75 parts of diethyl amino propylamine Employing the same procedure as set forth in Example A–XII, there was obtained a yield of 325 parts of substantially anhydrous liquid acetone-formaldehyde reaction product which is of a resinous nature, is straw colored and is hereinafter known as Product A–XIII.

EXAMPLE A–XIV 170 parts of aqueous solution of formaldehyde (37%)
60 parts of acetone
0.5 parts of diethyl amino propyl amine The above components were mixed and placed under a reflux condenser. The pH of the mix was determined and found to be about 9. The mix was heated gently to accelerate the speed of the exothermic reaction. When the exothermic reaction had subsided, the mass was maintained in the state of boiling for ½ hour. Then the condenser was removed and the mass dehydrated under vacuum at about 70 mm. of mercury pressure and a temperature of about 90–95° C. to obtain a liquid substantially anhydrous acetone-formaldehyde reaction product which was of a resinous nature and straw colored and is hereinafter known as Product A–XIV.

EXAMPLES A–XV–A–XVII

Using the same two components of Example A–XIV in the same amounts as therein set forth and also the third component, except that the third component is present in the following respective amounts: 1 part in one case, 5 parts in another and 25 parts in the third and using the method set forth in Example A–XIV, there were obtained liquid substantially anhydrous acetone-formaldehyde reaction products all of which were of a resinous nature, straw colored and are hereinafter respectively known as Products A–XV, A–XVI and A–XVII. The pH of Products A–XV, A–XVI and A–XVII were determined and found to be respectively 8.5, 9.5 and 10.5. Such determinations were made on aqueous solution of said respective products dissolved in 4 times their weight of water.

EXAMPLE A–XVIII 170 parts of aqueous solution of formaldehyde (37%)
60 parts of acetophenone
25 parts of diethyl amino propyl amine Yield 110 parts of Product A–XVIII.

EXAMPLE A–XIX 85 parts of aqueous solution of formaldehyde (37%)
110 parts of diacetone alcohol
5 parts of diethyl amino propyl amine Yield 110 parts of Product A–XIX.

EXAMPLE A–XX 170 parts of aqueous solution of formaldehyde (37%)
60 parts of mesityl oxide
5 parts of diethylamino propyl amine Yield 106 parts of Product A–XX.

EXAMPLE A–XXI 170 parts of aqueous solution of formaldehyde (37%)
72 parts of methyl ethyl ketone
25 parts of diethyl amino propyl amine Yield 127 parts of Product A–XXI.

EXAMPLE A–XXII 170 parts of aqueous solution of formaldehyde (37%)
60 parts of acetonyl acetone
25 parts of diethyl amino propyl amine Yield 125 parts of Product A–XXII.

EXAMPLE A–XXIII 170 parts of aqueous solution of formaldehyde (37%)
130 parts of ethyl ester of aceto acetic acid
25 parts of diethyl amino propyl amine Yield 180 parts of Product A–XXIII.

EXAMPLE A–XXIV 170 parts of aqueous solution of formaldehyde (37%)
60 parts of isophorone
25 parts of diethyl amino propyl amine Yield 118 parts of Product A–XXIV.

Employing the components in the proportions set forth in Examples A–XVIII to A–XXIV and using the procedure set forth in Example A–IX, there were produced the ketone-formaldehyde reaction products in the substantially anhydrous liquid state and being of a resinous nature and respectively known hereinafter as Products A–XVIII to A–XXIV, respectively in the yields given.

EXAMPLE A–XXV 170 parts of aqueous solution of formaldehyde (37%)
60 parts of acetone
1 part of triethylamine

EXAMPLE A–IV 720 parts of methyl ethyl ketone
1700 parts of aqueous formaldehyde (37%)
68 parts of sodium hydroxide in
135 parts of water The ketone and aqueous solution of formaldehyde were charged into a reaction vessel having a reflux condenser connected thereto and a stirrer therein. While the mixture is being constantly stirred, there is added thereto about ¼ of said aqueous solution of caustic soda whereupon an exothermic reaction takes place and the reacting mass is permitted to attain a temperature in the range of about 90–105° C., and then is cooled to about 50–60° C. Then another ¼ of said aqueous solution of caustic soda is added to the mass which again causes an exothermic reaction to take place and again the reacting mass is permitted to attain a temperature in the range of 90–95° C. and again is cooled to about 50–60° C. The third and fourth quarters of the aqueous solution of caustic soda are respectively added and the same procedure as before started is employed. After the addition of the last ¼ of caustic soda solution, permitting the reaction to rise to 90–105° C., the entire mass is then externally heated to boiling and maintained in the state of boiling under said reflux condenser for about 1 hour. Then the mass is neutralized with dilute hydrochloric acid and the resulting salt solution is removed. The neutralized mass is water-washed to remove residual salt and then is dehydrated under vacuum of 20 mm. of mercury pressure while being heated to about 110° C. The resultant substantially dehydrated ketone-formaldehyde reaction product is a hard brittle, amber colored resin having a molecular weight of approximately 500 and 4% hydroxyl content and is hereinafter known as Product A–IV.

EXAMPLE A–V 200 parts of methyl isobutyl ketone
340 parts of formaldehyde (37% conc.)

were charged into a reaction vessel provided with a reflux condenser and stirrer. In a second container there was prepared a solution consisting of 25 parts of sodium hydroxide in 50 parts of water. While the mass in said reaction unit is being constantly stirred, there is added thereto 25 parts of said aqueous solution of sodium hydroxide, the mass was heated whereupon an exothermic reaction took place and the mass attained a temperature of approximately 200° F. whereupon it was cooled to about 150° F. At this stage, as before, the last 25 parts of said aqueous solution of sodium hydroxide was added to the mass, on the application of heat the exothermic reaction took place and the temperature of the mass reached approximately 200° F. Then, when the temperature of the mass began to drop, the mass was externally heated and maintained at a temperature of about 195° F. for approximately 2 hours. Then the mass was neutralized with dilute solution of sulfuric acid and water washed to remove salts and was subsequently dehydrated under vacuum of 20 mm. of mercury pressure while heated to a temperature of about 295° F. The resultant mass measured approximately 247 parts, is a light colored low viscosity resinous liquid. A 100 g. sample of said liquid after being maintained for 24 hours at 350° F. measured 60 grams. This product is known hereinafter as Product A–V.

EXAMPLE A–VI 200 grams of cyclohexanone
340 grams of formaldehyde (37% conc.)

were charged into a reaction vessel provided with reflux condenser and stirrer. While being constantly stirred, there was added thereto 7.8 parts of an aqueous solution of sodium hydroxide prepared by dissolving 10 parts of sodium hydroxide in 20 parts of water. This mixture was heated whereupon an exothermic reaction occurred which was very vigorous and is allowed to proceed with the external source of heat removed, until a temperature of approximately 210° F. is reached whereupon it is cooled to approximately 140° F. At this stage the remaining 22.5 parts of aqueous sodium hydroxide solution is added to said mass and an exothermic reaction takes place and is allowed to proceed whereupon the temperature of the mass increases. When the temperature begins to drop, external heat was applied and the mass was maintained at 205–215° F. for one hour. Then it was neutralized with dilute sulfuric acid, washed and dehydrated at 20–25 mm. of mercury pressure to 250° F. to obtain a solid substantially completely dehydrated resin hereinafter known as Product A–VI.

EXAMPLE A–VII 100 lbs. of mesityl oxide
340 lbs. of formaldehyde (37% conc.)

were charged into a reaction vessel provided with a reflux condenser and a high speed agitator. In a separate vessel there is prepared a solution consisting of 11 lbs. sodium hydroxide dissolved in 22 lbs. of water. While said mixture of mesityl oxide and formaldehyde is being constantly stirred, there is added thereto 16½ lbs. of the aqueous solution of sodium hydroxide whereupon an exothermic reaction takes place and the temperature of the mass is allowed to rise to about 200° F. At this stage the mass is cooled to 150° F. and then 8¼ lbs. of aqueous solution of sodium hydroxide is added thereto and again the exothermic reaction is allowed to proceed until the temperature of the mass reaches approximately 200° F. The mass is again cooled to about 150° F. and the remaining 8¼ lbs. of aqueous solution of sodium hydroxide is added and when the exothermic reaction has subsided, the mass is maintained at about 200° F. by the employment of external heat for approximately ½ hour. Dilute sulphuric acid is added thereto to neutralize the mass, the stirring is discontinued and the resin is allowed to settle to the bottom of the reaction vessel. The aqueous upper layer is decanted and the mass is then washed with an equal volume of water with stirring to wash out the salts. Then the mass is dehydrated by heating to a temperature of approximately 140° C. to provide a substantially anhydrous solid resin measuring about 165 lbs. and is known hereinafter as Product A–VIII.

EXAMPLE A–VIII 1140 parts of acetonyl acetone
340 parts of formaldehyde (37% conc.)

where charged into a reaction vessel provided with stirrer and reflux condenser. In a separate container there was prepared an aqueous solution of caustic soda consisting of 30 parts of NaOH and 60 parts of water. Then the same procedure as that of Example A–I was employed to provide a substantially solid resinous reaction product hereinafter known as Material A–VIII.

EXAMPLE A–IX 1700 parts of aqueous solution of formaldehyde (37% conc.)
600 parts of acetone
25 parts of triethylamine The three components are mixed together and warmed gently to accelerate the exothermic reaction which ensues and is allowed to continue under a reflux condenser after the external source of heat has been removed. When exothermic reaction subsides, external heat is again applied to maintain the mass in the state of boiling under the condenser for ½ hour. The condenser is then removed and the mass is heated to about 130° C. to dehydrate. The resultant substantially anhydrous acetone-formaldehyde liquid reaction product is of a resinous nature, is straw colored and is hereinafter known as Product A–IX and measured about 950 parts containing 0.75% nitrogen.

EXAMPLE A–X

Employing the same components in the respective amounts set forth in Example A–IX and employing the procedure as therein set forth except that the acid number of the formaldehyde solution has first been ascertained and then sufficient sodium carbonate is added thereto to reduce the acid number thereof to zero. The resultant substantially anhydrous acetone-formaldehyde reaction product is of a resinous nature, is straw colored and is hereinafter known as Product A–X and measured about 950 parts.

EXAMPLE A–XI

To 1700 parts of aqueous solution of formaldehyde (37%) is added a solution of 315 parts of acetone together with 25 parts of triethylamine. Under reflux condenser, the mass is warmed gently to accelerate the exothermic reaction. After the exothermic reaction has subsided, a solution of 315 parts of acetone together with 25 parts of triethylamine is added thereto. By the use of external heat the mass is maintained in the state of boiling under said condenser for 30 minutes. Then the mass is heated to about 130° C. to substantially completely dehydrate it. The yield is 973 parts of substantially anhydrous liquid acetone-formaldehyde reaction product which is of a resinous nature, straw colored and is hereinafter known as Product A–XI.

EXAMPLE A–XII 510 parts of aqueous solution formaldehyde (37% conc.)
360 parts of acetone
75 parts of diethylamino propyl amine The above components were mixed and placed under a reflux condenser and allowed to stand at room temperature (70° F.) whereupon an exothermic reaction occurred and the temperature of the mass reached 76° C. The mass was allowed to react for about 1½ hours, the condenser removed and then the mass was maintained, under reduced pressure of 70 mm. of mercury pressure, at a temperature of 95° C. until it was substantially completely dehydrated. This yielded 342 parts of substantially anhydrous liquid acetone-formaldehyde reaction product which was of a resinous nature, was straw colored and is hereinafter known as Product A–XII.

EXAMPLE A–XIII 510 parts of aqueous solution of formaldehyde (37% conc.)
180 parts of acetone
75 parts of diethyl amino propylamine Employing the same procedure as set forth in Example A–XII, there was obtained a yield of 325 parts of substantially anhydrous liquid acetone-formaldehyde reaction product which is of a resinous nature, is straw colored and is hereinafter known as Product A–XIII.

EXAMPLE A–XIV 170 parts of aqueous solution of formaldehyde (37%)
60 parts of acetone
0.5 parts of diethyl amino propyl amine The above components were mixed and placed under a reflux condenser. The pH of the mix was determined and found to be about 9. The mix was heated gently to accelerate the speed of the exothermic reaction. When the exothermic reaction had subsided, the mass was maintained in the state of boiling for ½ hour. Then the condenser was removed and the mass dehydrated under vacuum at about 70 mm. of mercury pressure and a temperature of about 90–95° C. to obtain a liquid substantially anhydrous acetone-formaldehyde reaction product which was of a resinous nature and straw colored and is hereinafter known as Product A–XIV.

EXAMPLES A–XV–A–XVII

Using the same two components of Example A–XIV in the same amounts as therein set forth and also the third component, except that the third component is present in the following respective amounts: 1 part in one case, 5 parts in another and 25 parts in the third and using the method set forth in Example A–XIV, there were obtained liquid substantially anhydrous acetone-formaldehyde reaction products all of which were of a resinous nature, straw colored and are hereinafter respectively known as Products A–XV, A–XVI and A–XVII. The pH of Products A–XV, A–XVI and A–XVII were determined and found to be respectively 8.5, 9.5 and 10.5. Such determinations were made on aqueous solution of said respective products dissolved in 4 times their weight of water.

EXAMPLE A–XVIII 170 parts of aqueous solution of formaldehyde (37%)
60 parts of acetophenone
25 parts of diethyl amino propyl amine Yield 110 parts of Product A–XVIII.

EXAMPLE A–XIX 85 parts of aqueous solution of formaldehyde (37%)
110 parts of diacetone alcohol
5 parts of diethyl amino propyl amine Yield 110 parts of Product A–XIX.

EXAMPLE A–XX 170 parts of aqueous solution of formaldehyde (37%)
60 parts of mesityl oxide
5 parts of diethylamino propyl amine Yield 106 parts of Product A–XX.

EXAMPLE A–XXI 170 parts of aqueous solution of formaldehyde (37%)
72 parts of methyl ethyl ketone
25 parts of diethyl amino propyl amine Yield 127 parts of Product A–XXI.

EXAMPLE A–XXII 170 parts of aqueous solution of formaldehyde (37%)
60 parts of acetonyl acetone
25 parts of diethyl amino propyl amine Yield 125 parts of Product A–XXII.

EXAMPLE A–XXIII 170 parts of aqueous solution of formaldehyde (37%)
130 parts of ethyl ester of aceto acetic acid
25 parts of diethyl amino propyl amine Yield 180 parts of Product A–XXIII.

EXAMPLE A–XXIV 170 parts of aqueous solution of formaldehyde (37%)
60 parts of isophorone
25 parts of diethyl amino propyl amine Yield 118 parts of Product A–XXIV.

Employing the components in the proportions set forth in Examples A–XVIII to A–XXIV and using the procedure set forth in Example A–IX, there were produced the ketone-formaldehyde reaction products in the substantially anhydrous liquid state and being of a resinous nature and respectively known hereinafter as Products A–XVIII to A–XXIV, respectively in the yields given.

EXAMPLE A–XXV 170 parts of aqueous solution of formaldehyde (37%)
60 parts of acetone
1 part of triethylamine The components are charged into a stainless steel autoclave and heated to raise the pressure therein to 100 lbs. p. s. i. and the mass was so maintained for 1 hour. The source of heat was removed and then the mass was dehydrated at 95° C. under 40 mm. of mercury pressure to obtain a yield of 82 parts of anhydrous liquid acetone-formaldehyde reaction product of a resinous nature, which is stable and water soluble and is known hereinafter as Product A–XXV.

EXAMPLE A–XXVI 170 parts of aqueous solution of formaldehyde (37%)
60 parts of acetone
5 parts of diethylamine The components are charged into a stainless steel autoclave whereupon an exothermic reaction occurs and the pressure goes to 150 lbs. p. s. i. The reaction is allowed to proceed under the aforesaid conditions and finally the pressure and temperature of the mass drops to normal. The mass is subjected to dehydration at 130° C. and there is obtained a liquid water insoluble acetone-formaldehyde reaction product in the substantially anhydrous state and measuring about 82 parts and is hereinafter known as Product A–XXVI.

Instead of using a closed vessel, such as the autoclave, the reaction may be carried out at atmospheric pressure under a reflux condenser and maintained in the state of boiling for about ½ hour and the substantially anhydrous reaction product obtained is liquid, water soluble and resinous and measures 95 parts and is hereinafter known as Product A–XXVII.

All of said novel ketone-formaldehyde reaction products are alkaline, that is, the pH of the water solution thereof is at least 7.2. A sample of reaction Product A–IX, for example, is strongly alkaline and has been stable for more than 2 months. It is not always possible to obtain liquid anhydrous acetone-formaldehyde reaction products of such strong alkalinity by reacting 2 moles of formaldehyde with one mole of acetone employing sodium hydroxide, for example, as the sole catalyst because such reaction products produced under such conditions would generally become solid and infusible before the dehydration step is completed.

EXAMPLE A–XXVIII 170 parts of aqueous solution of formaldehyde (37%)
30 parts of acetone
25 parts of triethylamine Employing the same procedure as that set forth in Example A–IX there was obtained a substantially anhydrous acetone-formaldehyde liquid reaction product which was of a resinous nature and is hereinafter known as Product A–XXVIII and measured about 95 parts.

EXAMPLE A–XXIX 85 parts of aqueous solution of formaldehyde (37%)
30 parts of paraformaldehyde
60 parts of acetone
25 parts of triethylamine The four components are mixed together under a reflux condenser and warmed gently to increase the speed of the exothermic reaction which proceeds and the temperature of the mass goes to about 165° F. After it has subsided, the mass is maintained in the state of boiling under the reflux condenser for about 1 hour. Remove condenser and the mass is heated to about 130° C. to dehydrate and the resultant product is substantially anhydrous liquid reaction product, hereinafter known as Product A–XXIX weighing about 85 parts.

EXAMPLE A–XXX 60 parts of acetone
340 parts of aqueous solution of formaldehyde (37%)
1.2 parts of potassium carbonate dissolved in
2.5 parts of water were charged into a reacting unit having a reflux condenser and were mixed together. External heat was applied until the temperature of the mass reached 145° F. External heat was removed because the exothermic reaction started and continued. The temperature rose to 165° F. The reaction was allowed to continue for 15 minutes and the temperature began to drop. The mass was cooled to about 140° F. and at this stage 60 parts of acetone and 5 parts of triethyl amine are added. Heat was applied to maintain the mass in the state of boiling under the condenser for ½ hour. The condenser was removed and the mass maintained at 225° F. to partially dehydrate and provide an 80% aqueous solution of the acetone-formaldehyde reaction product hereinafter known as Product A–XXX. The viscosity of said solution at 25° C. was 2440 cp., the specific gravity 1.205 at 25° C. and the Index of Refraction 1.4857 at 25° C.

EXAMPLE A–XXXI 340 parts of aqueous solution of formaldehyde (37%)
60 parts of acetone
2 parts of diethyl amino propyl amine were charged into a reacting vessel having a reflux condenser. The mass was stirred and external heat applied to hasten the exothermic reaction. The temperature rose to 175° F. and remained at that temperature for about 15 minutes. Then the mass was cooled to 140° F. and 60 parts of acetone and 12 parts of diethyl amino propyl amine were added. Again an exothermic reaction set in and the temperature rose to 165° F. At this stage, external heat was applied and the mass was maintained in the state of boiling for ½ hour. The condenser was removed and the mass was maintained at 225° F. to dehydrate to provide an 80% aqueous solution of resinous acetone-formaldehyde reaction product known hereinafter as Product A–XXXI which solution at 25° C. had the following characteristics: viscosity, 1670 cps., specific gravity, 1.215, and Index of Refraction, 1.4818.

EXAMPLE A–XXXII 1700 parts of aqueous solution of formaldehyde (37%)
315 parts of acetone were mixed together and then there were added thereto:

12.5 parts of triethylamine

The reaction was allowed to take place and cooling provided so that the exothermic reaction is not too vigorous. When the exothermic reaction had subsided, a charge of 315 parts of acetone
12.5 parts of triethylamine was added to said mass with stirring and a second exothermic reaction was allowed to take place. Then after this reaction had subsided the mass was refluxed for 1½ hours, then dehydrated at elevated temperature. To the liquid, dehydrated mass was added 300 parts of water and the temperature of the solution brought to 100° F. to which was added 50 parts of ammonium hydroxide. This will give about 70% solids and will cure in 3 minutes at 500° F. on glass wool to become water insoluble and a strong binder. The product is known hereinafter as Product A–XXXII.

While said Materials B may be normally liquid or normally solid, we have discovered that for certain purposes we prefer to employ such Materials B which have melting points of at least 50° C. and generally in the range of 50–160° C. and epoxide equivalents of at least 400 and generally in the range of 400–5000. While a great variety of Materials A may be employed, for certain purposes, it is preferred to employ such Materials A that a 100-gram sample thereof when maintained at 150° C. under reduced pressure of 40 mm. of mercury pressure, a residue remains, said residue being undistillable under said temperature and pressure conditions and measuring at least 60% by weight of said sample. Examples of some of such Materials A are Products A–I, A–IV, A–VII, A–XX, A–XXI, A–XXII and others. Such combinations in the proportions of Materials A and B as before set forth and with or without Materials C may be heated together at elevated temperatures which may be as high as 180° C. depending upon the specific components employed. Such mixtures are maintained at such elevated temperature until solution takes place and then are cooled with or without the use of appropriate solvents, such as xylol, Cellosolve, etc., to provide commercial products which may later be employed for different uses and converted to the substantially solid and infusible state. For such purpose, a small quantity of an acidic agent or catalyst may be employed, and the amount of such catalyst is generally in the range of 0.01–5 parts by weight of acidic catalyst to each 100 parts of the combined weights of Materials A and B with or without Material C and/or D depending upon the particular catalyst used as well as the time for converting such combinations to the solid and infusible state. Illustrative examples of some of such acidic catalysts are hydrochloric, sulphuric, phosphoric, paratoluene sulfonic, monobutyl phosphoric, dibutyl phosphoric and monochloracetic acids.

All of the various combinations of Materials A and B with or without C and D may be modified by the addition thereto of a monocarboxylic or polycarboxylic organic acid or by an amine.

When an aliphatic monocarboxylic acid is employed, in some cases it is preferable that such acid first be reacted with Material A and the resultant reaction mass which may or may not have been oil modified, is liquid at a temperature below 210° C. and is then combined with Material B with or without C and/or D. Such novel combinations find utility in the arts as coating compositions, for wire, paper, cloth, sandpaper coating adhesives, etc.

The monobasic organic acids employed may be either saturated or unsaturated and in any case have 2–24 carbon atoms, and examples of some of them which are saturated are acetic acid, butyric acid, propionic acid, valeric acid, caproic acid, etc., as well as their anhydrides, stearic acid, etc., and examples of those which are unsaturated are oleic, linoleic, linolenic, ricinoleic, synthetic fatty acids, linseed oil fatty acids, soyabean oil fatty acids, castor oil fatty acids, China-wood oil fatty acids, rapeseed oil fatty acids, safflower oil fatty acids, perilla oil fatty acids, fish oil fatty acids, etc. For certain purposes when the unsaturated fatty monocarboxylic acids are employed, it is preferred that such fatty acids be of the formula: R—COOH with R being an unsaturated aliphatic hydrocarbon radical of at least 12 carbon atoms and in general in the range of 12–24 carbon atoms in straight chain relationship and with the unsaturation due to at least one, that is, one or more, ethylenic linkages.

Such aliphatic monocarboxylic acids may be combined with said Materials A by heating mixtures thereof at elevated temperatures whereupon reaction and possibly solution occurs. When the anhydrides of the saturated monocarboxylic acids of 2–6 carbon atoms are used, the temperature employed is generally approximately 60° C. or higher depending upon the particular components in the mixture, whereupon an exothermic reaction takes place and the temperature of the mass rises above 100° C. After the exothermic reaction has subsided, the mass may be heated to drive off unreacted anhydride which was present in the original mix in excess of that required for esterification of all of the hydroxyl groups originally present in Material A. Instead of employing an excess of such anhydride in such mixture, it may be present in lesser amounts so that at least 50% and less than 100% esterification of Material A occurs.

When the monocarboxylic unsaturated fatty acids are to be combined with Material A mixtures of such components may be heated to at least about 180° C. and generally to 180–300° C. whereupon reaction takes place as evidenced by water of reaction coming off and the mass becoming clear. The reaction may be continued as long as desired, but in general is terminated before gelation. Upon cooling to room temperature, the mass will be found to be clear, is soluble in xylol and xylol-alcohol, and at 200° C. is liquid. The ratio by weight of Material A to said unsaturated aliphatic fatty acids is generally in the range of 100 parts of the former to 10–150 parts of the latter depending upon the particular Material A and unsaturated fatty acid employed.

Said heat combined Materials A and unsaturated fatty acids may, if desired, be modified with unsaturated fatty oils, which may be in the unbodied blown and/or heat bodied state. Examples of such oils are linseed, soyabean, castor, China-wood, rapeseed, safflower, oiticica, fish oils, etc.

Such heat combined Materials A and unsaturated fatty acids, which combinations are clear and liquid at 200° C., may be heat combined with such oils in the range of about 200–225° C.

If it is desired to combine 100 parts by weight of (a) said oils with 100 parts by weight of (b) heat combined Material A and unsaturated fatty acid to provide a clear resultant mass at room temperature, it is necessary to add the oils in increments measuring by weight no greater than approximately 35 parts per 100 parts of b and heating the mass to clear solution before the next increment addition. The method which is preferably employed is to heat b to elevated temperature in the range of about 200–250° C. Then if it is desired to combine an equal quantity of said oils thereto, the oils are divided into about three-twentieth equal increments by weight. One increment is then added to the b and the mix is maintained in said temperature range while constantly stirred until the mass is clear and a sample thereof is clear when cooled to room temperature; then the next increment is added and the same procedure followed, and so on until the last increment has been added and the mass is clear at elevated temperature and at room temperature, to provide a class of products which are liquid at 150° C. The ratio by weight of one or a combination of two or more of said b to one or a combination of 2 or more of said a oils is preferably 100 parts of the former to 10–100 parts of the latter.

In factory practice it is preferable that the oil be added slowly to b while b is in said elevated temperature range and constantly stirred, and when an increment measuring approximately 5–20 parts of oil per 100 parts of b has been added thereto, the further addition of oil is terminated and the mass is maintained in said temperature range until it becomes clear and a sample thereof at room temperature is clear. Then the next increment of oil is added as before and such procedure is followed until the last increment has been added and there is produced a mass which at room temperature is clear and homogeneous.

The following examples, Examples AM–VIAM are given merely to illustrate various ketone-formaldehyde reaction products, examples of which are all of said Products A–I to A–XXXII, which are esterified with a saturated fatty acid.

*Example AM*

100 parts of substantially completely dehydrated Products A respectively of each of the previous examples and 200 parts of acetic acid anhydride, propionic acid anhydride, butyric acid anhydride, valeric acid anhydride or caproic acid anhydride were charged into a glass vessel and mixed together. While being constantly stirred and maintained under a reflux condenser the mass was heated to an elevated temperature which was approximately 60° C. or higher temperature depending upon the particular acid anhydride employed, whereupon an exothermic reaction occurs. The external source of heat is removed and the exothermic reaction is allowed to proceed and the temperature of the mass may go as high as 140° C. or higher. About 1 hour or so thereafter the exothermic reaction will be found to have subsided. Then the condenser is removed and the mass is heated at a temperature sufficiently high to drive off water, any unreacted anhydride as well as any volatile acids which may have been formed. The resultant mass consists essentially of the ketone-formaldehyde reaction products which have been esterified, the hydrogen of the hydroxyl groups have been substituted by R—CO in which R is an aliphatic hydrocarbon radical of 1–5 carbon atoms and these products are hereinafter known respectively as Products AM and are all liquid at 300° F.

Example I–AM 100 parts of substantially completely dehydrated Product A–I and 25 parts of acetic acid anhydride were charged into a glass reacting vessel and mixed together. While being constantly stirred and maintained under a reflux condenser, the mass was heated to approximately 60° C. whereupon an exothermic reaction occurs. The external source of heat is removed and the exothermic reaction is allowed to proceed whereupon the temperature of the mass may go as high as 140° C. After about one hour, the exothermic reaction will have been found to have subsided. Then the mass is maintained at the state of boiling for 1 hour after which the condenser is removed and the mass is heated to about 160–170° C. to drive off any water and unreacted acid anhydride as well as volatile acids which may have been formed. The resultant mass is esterified acetone-formaldehyde reaction product and is a very heavy viscous semi-solid product a portion of which is crystalline. This product, hereinafter known as Product I–AM, has the effect of surface drying and has an Iodine No. of 20–25. This product is Product A–I which has been only partially esterified and therefore still contains some OH groups which, if desired, may be esterified.

Example II–AM 200 parts of butyric acid anhydride, 200 parts of substantially completely dehydrated Product A–II, 1 part of potassium persulphate and 10 parts of hydrogen peroxide (90% conc.) were charged into a glass reacting vessel and mixed together while being constantly stirred and by the application of heat maintained in the state of boiling under a reflux condenser for a period of approximately 3 hours. The mass became thick. Then the condenser was removed and the mass was heated to about 150° C. to remove any water and unreacted anhydride and thereafter cooled to room temperature. This product consisting essentially of esterified acetone-formaldehyde reaction product is hereinafter known as Product II–AM. Product II–AM may then be dissolved in methyl isobutyl ketone to form a solution, such solution finding application in the coating arts and may be applied on a base such as matted or woven glass fabric, etc., to coat and/or impregnate the same after which the solvent is driven off and Product II–AM remains thereon and is oven cured at approximately 200° F. If desired the persulphate and peroxide may be omitted to provide a reaction product in which the hydrogen of all of the OH groups of Product A–II are replaced by $C_3H_7$—CO.

Example III–AM 200 parts of substantially completely dehydrated Product A–IV and 200 parts of acetic acid anhydride were charged into a glass reacting vessel and mixed together. While being constantly stirred and maintained under a reflux condenser, the mass was heated to elevated temperature until an exothermic reaction occurred and external source of heat removed. This exothermic reaction was allowed to proceed uninhibited and at the end of the reaction the temperature of the mass decreased and then increased to 160–170° C. to drive off any unreacted acid anhydride to provide Product III–AM consisting essentially of substantially completely esterified methyl ethyl ketone-formaldehyde reaction product and is Product A–IV whose H of its OH groups have been substituted by $CH_3$—CO.

Example IV–AM 200 parts of substantially completely dehydrated Product A–XX and 200 parts of propionic acid anhydride were put into a glass reacting vessel and mixed together. While being constantly stirred and maintained under a reflux condenser, the mass was heated until an exothermic reaction occurred. The external source of heat was removed and the exothermic reaction was allowed to proceed. After the exothermic reaction has subsided, the condenser is removed and the mass is heated to about 180° C. to drive off water, any unreacted acid anhydride as well as other volatiles which may have been formed. The resultant product consisting essentially of esterified Product A–XX whose hydroxy groups have had the hydrogens thereof substituted by $C_2H_5$—CO, is known hereinafter as Product IV–AM.

Example V–AM 200 parts of substantially completely dehydrated Product A–XIX and 200 parts of caproic acid anhydride were charged into a vessel and mixed together. While being constantly stirred and maintained under a reflux condenser, the mass was heated to an elevated temperature until an exothermic reaction occurred. The external source of heat was removed and the exothermic reaction was allowed to proceed. Then the condenser was removed and the mass was heated to drive off water, any unreacted acid anhydride as well as other volatiles which may have been formed. The resultant mass consists essentially completely of esterified Product A–XIX whose H of its OH groups have been replaced by $C_5H_{11}$—CO and is known hereinafter as Product V–AM.

Example VI–AM

Following exactly the same procedure as that set forth in Example II–AM except that 200 parts of valeric acid anhydride is used in place of the 200 parts of butyric acid anhydride, there was produced a resultant mass consisting essentially of esterified Product A–II whose hydrogens of its OH groups have been replaced by $C_4H_9$—CO and is known hereinafter as Product VI–AM.

The following Examples VII–AM to XXVIII–AM are given to illustrate various ketone-formaldehyde reaction products examples of which are all of said Products A in all of the foregoing examples which are combined with an unsaturated fatty acid and being fatty oil modified or unmodified.

Example VII–AM 180 parts of Material A–IV
90 parts of dehydrated castor oil fatty acids
were charged into a reaction vessel and stirred together at room temperature. The mass was examined and found to be a cloudy mixture. This mixture was heated to a temperature in the range between 270–295° C. while being stirred and maintained under said conditions for approximately 30 minutes. In the course of this heating, water of reaction came off of the mass and at the end of this heating the mass, while still liquid at that temperature, was clear and a sample thereof when cooled to room temperature was clear. The external source of heat was removed and the mass was allowed to cool to room temperature and was clear and is hereinafter known as Product VII–AM.

By employing the same procedure as that set forth in Example VII–AM, but employing the components of Examples VIII–AM to XVII–AM and except that temperatures may vary but are 180° C. or above, a wide variety of other novel products are produced, and are hereinafter respectively known as Products VIII-AM-XVII-AM.

*Example VIII-AM*

195 parts of Material A-IV
90 parts of linseed oil fatty acids

*Example IX-AM*

150 parts of Material A-I
75 parts of linseed oil fatty acids

*Example X-AM*

245 parts of Material A-VII
225 parts of dehydrated castor oil fatty acids

*Example XI-AM*

165 parts of Material A-XX
82.5 parts of dehydrated castor oil fatty acids

*Example XII-AM*

175 parts of Material A-XXI
75 parts of oleic acid

*Example XIII-AM*

160 parts of Material A-IV
50 parts of dehydrated castor oil fatty acids

*Example XIV-AM*

160 parts of Material A-XX
65 parts of recinoleic acid

*Example XV-AM*

165 parts of Material A-XXII
85 parts of linseed oil fatty acids

*Example XVI-AM*

175 parts of Material A-XXI
125 parts of dehydrated castor oil fatty acids

*Example XVII-AM*

160 parts of Material A-XX
80 parts of linseed oil fatty acids

The reaction Products VII-AM to XVII-AM all are clear at elevated temperature and also at room temperature and are liquid at 200° C. Other products may be produced by varying the ratio of the specific Materials A to unsaturated fatty acid from those in said Examples VII-AM to XVII-AM and/or also by varying the specific Material A and/or unsaturated fatty acids employed in said examples. Thus a great number of products may be produced, some of them being solid while others are liquid at room temperature, but in all instances are clear at room temperature and are liquid at 200° C. and are soluble in xylol and xylol-alcohol.

We have discovered that unsaturated fatty oils having an average of at least 12 carbon atoms and an average of 12-24 carbon atoms may be combined with said products, examples of which are Products VII-AM to XVII-AM, produced by heat combining Material A with unsaturated fatty acids. They may be combined with said oils by maintaining a mixture thereof and said oils at temperatures in the range of about 200-250° C. whereupon a clear mass is produced and upon cooling to room temperature is still clear. However, in combining such products with said oils, the ratio by weight of the oils added thereto must be controlled otherwise the desired result is not attainable.

*Example XVIII-AM*

165 parts of Product VII-AM
85 parts of linseed oil

The Product VII-AM is heated to and maintained at approximately 210° C. and while maintained at that temperature and constantly stirred, there is added slowly thereto about one-half of the quantity of linseed oil to be combined therewith. After the addition of said one-half portion of linseed oil, the mass is still maintained at said elevated temperature while being constantly stirred, until a sample of the mass when cooled to room temperature is homogeneous and clear. Then the other half portion of the linseed oil is, as before, slowly added to said mass at elevated temperature and maintained at such elevated temperature until a sample of the resultant mass at room temperature is homogeneous and clear. The resultant mass may be cooled to room temperature and at that temperature is homogeneous and clear, is liquid at 150° C. and is hereinafter known as Product XVIII-AM.

Following the same procedure as that set forth in Example XVIII-AM, but employing the components set forth in the following Examples XIX-AM to XXVIII-AM respectively, there are produced Products XIX-AM to XXVIII-AM respectively, all of which at room temperature are homogeneous and clear and all of which are liquid at 150° C.

*Example XIX-AM*

200 parts of Product VIII-AM
60 parts of China-wood oil

*Example XX-AM*

300 parts of Product IX-AM
75 parts of soyabean oil

*Example XXI-AM*

175 parts of Product X-AM
25 parts of safflower oil

*Example XXII-AM*

350 parts of Product XI-AM
50 parts of rapeseed oil

*Example XXIII-AM*

175 parts of Product XII-AM
25 parts of Perilla oil

*Example XXIV-AM*

225 parts of Product XIII-AM
85 parts of oiticica oil

*Example XXV-AM*

185 parts of Product XIV-AM
65 parts of linseed oil

*Example XXVI-AM*

375 parts of Product XV-AM
95 parts of soyabean oil

*Example XXVII-AM*

200 parts of Product XVI-AM
55 parts of linseed oil

*Example XXVIII-AM*

200 parts of Product XVII-AM
60 parts of soyabean oil

A wide variety of other oil modified products may be produced by varying the proportion of oil and by employing different oils than those shown in the examples. Said oil modified products, examples of which are Products XVIII-AM to XXVIII-AM, are liquid at temperatures below 210° C. and may be thinned with an appropriate thinner, such as xylol or "Cellosolve" and may be employed in the same manner as hereinbefore set forth to provide insulated conductors, coated bases and abrasive sheets.

All of said Materials A, either modified or unmodified to provide the various AM products, examples of which are Products AM and I-AM to XXVIII-AM may be combined with Materials B, with or without Materials C and/or Materials D. Materials D are polyhydric phenols, examples of which are resorcinol, catechol, hydroquinones, cardol, etc., which are used in amounts equal to about 2-25 parts by weight per 100 parts of the combined weights of A and B.

The following are specific examples of some of the various compositions of the present invention, given by way of illustration, and not limitation, all parts being given by weight unless otherwise specified.

In the following examples, the following Material B will be employed:

"Shell Epon 562" which is a normally liquid glycidyl polyether of glycerine and has an epoxide equivalent of 140–165;

Glycidyl polyether of 5-pentadecyl resorcinol, having melting point of 19–23° C. and epoxide equivalent of 315;

Product IE of Example 1 of Wasserman U. S. Patent 2,665,266, which is glycidyl polyether of reaction product of hydroxy benzene and cashew nut shell liquid and is normally liquid and has an epoxide equivalent of 400–500;

And various monomeric and polymeric glycidyl polyethers of 2,2-bis,parahydroxy phenyl propane having the following melting points and epoxide equivalents and known on the market as follows:

"Shell Epon 828" having melting point of 8–12° C. and epoxide equivalent of 190–210.

"Shell Epon 864" having a melting point of 40–45° C. and epoxide equivalent of 300–375.

"Shell Epon 1001" having a melting point of 64–76° C. and epoxide equivalent of 430–525.

"Shell Epon 1004" having melting point of 95–105° C. and epoxide equivalent of 870–1025.

"Shell Epon 1007" having a melting point of 127–133° C. and epoxide equivalent of 1550–2000.

"Shell Epon 1009" having melting point of 145–155° C. and epoxide equivalent of 2400–4000.

EXAMPLE 1

25 parts of Product A–I and 100 parts of "Shell Epon 828" were mixed together and heated to a temperature of approximately 100° C. to provide novel Product 1. If desired, 10 parts of Product 1 may be heat combined with 1 part of either catechol or "Varcum 148" to provide novel products, both of which may be used as casting compositions curable with 1.5 parts of triethylene tetramine and/or 3 parts of phthalic anhydride.

If desired, to 10 parts of said Product 1 there may be added approximately 20 parts of acetic anhydride. These components are placed in a reaction vessel having a reflux condenser and are heated to an elevated temperature of approximately 140° C. and maintained at 120–140° C. for approximately two hours. Then the mass is dehydrated under reduced pressure to remove water and unreacted acetic anhydride and other volatiles. The resultant mass, hereinafter known as Product 1–(a) finds application in a number of different fields and may be used as a plasticizer for various resinous materials, such as cellulose acetate, etc.

To 5 parts of Product 1–(a) there may be added 1 part of "Varcum 2869–B" and heated to solution to provide Product 1–(a–1) useful as a baking coating material for abrasives, etc. Instead of employing said 1 part of "Varcum 2869–B," there may be substituted therefor 0.5 part of resorcinol to provide a baking coating material for drums and the like.

Said Product 1 may be dissolved in an organic solvent such as butanol, for example, by warming together equal parts of said butanol and Product 1 to provide a solution, then to 10 parts of said solution there may be added 0.5 part of diethylene triamine which is uniformly distributed therethrough, and this mass may be coated directly on to a base, such as a newly plastered wall, after which the solvent evaporates therefrom and the resultant film cures at room temperature to a substantially solid, tough film. If desired, 10 parts of Product 1 may be mixed with 5 parts of phthalic anhydride, and this mixture is heated for reaction until the acid number has been reduced to a value of less than 10. This mass is then dissolved in an equal part of butanol, and resultant solution may be coated directly onto the interior surface of a metal drum and passed through an oven at 450° F. for ten to fifteen minutes, whereupon the solvent evaporates therefrom and the resultant film thereon is converted to a substantially solid and infusible state.

If desired, 10 parts of Product 1 may be mixed with linolenic acid, and this mixture is heated to a temperature between 200–250° C. and maintained at that temperature until the acid number is approximately 5. The mass is then cooled and dissolved in xylene. This solution may be coated on the inside of a metal drum which is treated as before to provide a tough, solid, continuous, resistant film.

EXAMPLE 2

95 parts of Product A–XX and 5 parts of "Shell Epon 828" are warmed together for solution to provide novel Product 2. Then to 10 parts of Product 2 there is added 2.5 parts of adipic acid, and this mixture is heated to approximately 150° C., held at that temperature until a sample thereof when removed and cooled to room temperature is a brittle button. At this stage the mass is poured into pans and cooled to room temperature and found to be a brittle solid which now may be ground or otherwise comminuted into a fine powder or dust. This material may be employed as a binder for abrasive particles in grinding wheels. It also may be dissolved in a solvent, then spread in a thin film and, when baked, employed as a binder for uniting abrasive particles to paper in the manufacture of sand paper.

EXAMPLE 3

95 parts of "Shell Epon 562" and 5 parts of Product A–IV were warmed until solution resulted, and this liquid mass may be poured directly into a container containing an electrical component to be encapsulated, and then, while warm, there is added thereto 5 parts of diethylene triamine which is uniformly distributed therethrough and the mass subsequently will be converted to the substantially solid state to encapsulate said electrical component.

EXAMPLE 4

50 parts of Product A–V
50 parts of "Shell Epon 864"
30 parts of maleic anhydride were mixed together to uniformity and heated to about 100° C. whereupon an exothermic reaction occurred and the temperature rose and then began to lower and was then held at about 160° C. until a sample thereof was a brittle button. At this stage the mass was cooled to room temperature and ground into a powder. Then 20 parts of this powder was mixed with 100 parts of aluminum oxide of 40 mesh size and this mixture was cold pressed to the desired shape and size and cured at increasing temperatures from room temperature to 375° C. over a 16 hour period and then held at that temperature for an additional 8 hours after which it was cooled. Such compositions are useful as grinding wheel resins.

EXAMPLE 5

15 parts of Product A–VI
15 parts of said glycidyl polyether of 5-pentadecyl resorcinol
15 parts of phthalic anhydride were mixed to uniformity and then heated to 150° C., and spread on glass cloth, which was cooled and then cut into 2″ strips which were wound around a mandrel to provide a multiple structure which was cured at 385° C. for 24 hours to provide a novel and highly useful glass tubing.

EXAMPLE 6

Employing the same components in the same proportions and the same method as that set forth in Example 5, except that for the 15 parts of phthalic anhydride there is substituted 15 parts of chlorinated phthalic anhydride, there is provided another novel and highly useful composition.

EXAMPLE 7

50 parts of Material A–VI
25 parts of "Shell Epon 1007"
100 parts of Cellosolve solvent were mixed together and heated to 150° C. and maintained at that temperature until complete solution takes place and then cooled to room temperature. The resultant clear solution is a novel product which is stable at ordinary temperatures encountered in transportation and storage and as such may be sold as a product of commerce. It finds application in a number of different fields: It may be employed for providing a coating on metals, for example metal cans, drums, wire, etc., also as binders for asbestos etc. The inside and/or outside of the usual metal can or drum may be coated with a layer of said solution and then is placed in an oven at about 450° F. for about 15–30 minutes whereupon the solvent is driven off and the resultant coating is converted to the substantially solid and infusible state. The time of curing said coating may be reduced by adding to said solution before application an amount of phosphoric acid equal to 1% by weight of said solution. A metal wire, such as a copper conductor may be continuously passed through said solution whereby it becomes coated with said solution and then passes through an oven at about 600° F. for a period of about 30–60 seconds to drive off the solvent and convert the resultant coating to the solid and substantially infusible state. A woven asbestos band may be soaked with said solution. Then it is cut into strips of appropriate length and formed into arcuate bands which while in a mold are maintained at 450° F. to drive off the solvent and convert the resultant solution to the substantially solid and infusible state to provide a friction element, such as a brake lining or clutch facing in which said solution converted to the infusible state acts as a binder and friction augmenter.

By employing the same procedure as that set forth in Example 7 but employing the components set forth in Examples 8–74, a wide variety of other novel products and articles of manufacture may be obtained.

EXAMPLE 8

25 parts of Material A–IV
50 parts of "Shell Epon 1004"
100 parts of Cellosolve solvent

EXAMPLE 9

15 parts of Material A–V
25 parts of Material A–IV
25 parts of "Shell Epon 1007"
500 parts of Cellosolve solvent

EXAMPLE 10

50 parts of Material A–VI
50 parts of "Shell Epon 1009"
200 parts of Cellosolve solvent

EXAMPLE 11

50 parts of Material A–VII
75 parts of "Shell Epon 1001"
150 parts of Cellosolve solvent

EXAMPLE 12

25 parts of Material A–I
50 parts of "Shell Epon 1004"
100 parts of Cellosolve solvent

EXAMPLE 13

30 parts of Material A–II
70 parts of "Shell Epon 1004"
100 parts of Cellosolve solvent

EXAMPLE 14

25 parts of Material A–III
75 parts of "Shell Epon 1007"
100 parts of Cellosolve solvent

EXAMPLES 15–22

Employing the same procedure and proportion of components as hereinbefore set forth in Examples 7–14, respectively, except that to each of them there is added before heating to 150° F. a quantity of the "G. E. R–108" resin measuring by weight about ½ of the weight of the particular Material or Materials A used therein to provide novel products and also novel coated elements.

EXAMPLES 25–32

Employing the same procedure and proportionate components as those set forth in Examples 15–22 respectively, except that for the "G. E. R–108" there is substituted "Varcum 2869–B" to produce additional novel products and novel coated elements.

EXAMPLES 33–40

Employing the same procedure and proportions of components as those set forth in Examples 15–22 respectively, except that thermosetting cardanol-formaldehyde resin is substituted for the "G. E. R–108" to provide still other examples of novel products of this invention and coated elements.

EXAMPLES 41–74

Employing the same components in the proportions set forth in Examples 7–40 respectively, except that the solvent is omitted in each instance, the components are heated together at 150° C. and maintained at this temperature until solution takes place and then cooled to room temperature to provide clear solutions in the solid state. They are then comminuted to a fine powdered state and may be employed as binders in molding powders or the like, or they may be dissolved in such solvent and used as before, and in any case in the presence or absence of about 10% by weight thereof of triethylene tetramine or phthalic anhydride and with or without about 5% by weight thereof of resorcinol, are convertible to the infusible state at 450° F. If desired, 20 parts of said comminuted products respectively are combined with 60 parts of asbestos fibers to provide uniform mixtures. Such mixtures may be placed in a mold and maintained at 450° F. for 15–30 minutes to provide hard, chemically resistant elements which may serve as friction elements, etc.

EXAMPLE 75

94 parts of Product VIII–AM
5 parts of "Shell Epon 1009"

were heated together until solution takes place and is then dissolved in butyl Cellosolve to approximately 60% concentration. This solution may be applied as a coating, after which the solvent is evaporated therefrom and the remaining film is heat converted at about 450° F. to a substantially solid state to provide a resistant tough film. This is particularly useful as a protective coating material for various bases, such as drums, as a binder or coating for abrasive particles for sandpaper, etc.

EXAMPLE 76

80 parts of Product X–AM
20 parts of "Shell Epon 1007"

were heated together for solution and then poured into shallow pans and thereafter cured at 350° F. for 48 hours with or without 10 parts of maleic anhydride or triethylene tetramine, either in the presence or absence of 10 parts of "Varcum 148" or resorcinol. The mass will be found to be solid and may be comminuted and employed as friction augmenting particles in friction elements, such as brake linings and clutch facings.

Employing the same procedure as that set forth in Example 76, except that for Product X–AM there is substituted a corresponding amount of each of the respective Products VIII–AM, IX–AM and XII—AM to XVII–AM there are produced further products finding application as hereinbefore set forth.

EXAMPLE 77

95 parts of respective Products XVIII–AM and XXVIII–AM are mixed together with 5 parts of "Shell Epon 1009." This mixture, together with a solvent such as butyl Cellosolve is heated for solution. This solution which may be approximately 50% concentration, may be employed as a coating for metal drums and the like, after which they are maintained in an oven at 450° F. to drive off the solvent, after which the remaining film is cured to a substantially solid and tough state.

EXAMPLE 78

5 parts of respective Products II–AM to VI–AM and 95 parts of "Shell Epon 1004" together with 100 parts of a solvent such as xylene, and with or without 10 parts of "Varcum 148" or resorcinal were heated together for solution, then there is added thereto 35 parts of phthalic anhydride. This may be employed as a coating for glass cloth and other bases, such as the inside of drums, etc., after which the coated base is placed in an oven at 400° F. to drive off the solution and convert the remaining film to a substantially solid and tough state.

The presence of said Materials A in all of the aforesaid combinations increases the heat resistance of the glycidyl ethers when cured and also prevents or reduces crystallization and cracking of such cured glycidyl ethers at elevated temperatures. The curing of all of said compositions of Materials A and B with or without C or D may be effected by the use of amines or polybasic acids or mixtures thereof which are capable of curing the glycidyl ethers themselves, and specific examples of them are disclosed in the U. S. patent to Wasserman 2,665,266 of January 5, 1954.

Examples of some of said Materials C which may be employed in the practice of this invention are known on the market as the following phenol-aldehyde thermosetting resins: "G. E. R–108" (allyl phenol-formaldehyde); "Varcum 2869–B" (cresylic acid-formaldehyde); "Varcum 148" (xylenol-formaldehyde); "Durez 15956"; cardanol-formaldehyde; tertiary butyl phenol-formaldehyde; cardanol-fur-furaldehyde, etc.

This application is a continuation-in-part of our co-pending applications Serials No. 482,052 filed March 3, 1955, Serial No. 501,204 filed April 13, 1955, Serial No. 556,799 filed January 3, 1956 and 577,945 filed April 15, 1956, all now abandoned.

Having thus described the invention, we claim:

1. A novel composition of matter comprising (A) ketone-formaldehyde organic reaction product liquid at a temperature below 300° F. and (B) glycidyl ether of a compound selected from the group consisting of polyhydric phenols and polyhydric alcohols, said B being liquid at a temperature below 350° F., the ratio by weight of A to B being 100 parts of A to 5–2000 parts of B.

2. A composition of matter as defined in claim 1, with the ketone being mesityl oxide.

3. A composition of matter as defined in claim 1, with the ketone being methyl ethyl ketone.

4. A composition of matter as defined in claim 1, with the ketone being cyclohexanone.

5. A composition of matter as defined in claim 1, with the ketone being diacetone alcohol.

6. A composition of matter as defined in claim 1, with the ketone being acetonyl acetone.

7. A composition of matter defined in claim 1 cured together with a material capable of curing said glycidyl ether and selected from the group consisting of (a) amines, (b) polycarboxylic acids and (c) mixtures of a and b.

8. A novel composition of matter produced by heat combining (a) a composition defined in claim 1 and (b) a monocarboxylic fatty acid having a maximum of 24 carbon atoms.

9. A novel composition of matter produced by heat combining (a) a composition defined in claim 1 and (b) a saturated monocarboxylic saturated fatty acid having a maximum of 24 carbon atoms.

10. A novel composition of matter produced by heat combining (a) a composition defined in claim 1 and (b) an unsaturated monocarboxylic fatty acid in 12–24 carbon atoms.

11. A novel composition of matter comprising (A) ketone-formaldehyde organic reaction product liquid at a temperature below 300° F., (B) glycidyl ether of a compound selected from the group consisting of polyhydric phenols and polyhydric alcohols, said B being liquid at a temperature below 350° F. and (C) a phenol-aldehyde thermosetting resin liquid at 100° C., the ratio by weight of A to B being 100 parts of A to 5–2000 parts of B, with the ratio by weight of C to the combined weights of A and B being 5–50 to 100.

12. A novel composition of matter comprising (A) ketone-formaldehyde organic reaction product liquid at a temperature below 300° F., (B) glycidyl ether of a compound selected from the group consisting of polyhydric phenols and polyhydric alcohols, said B being liquid at a temperature below 350° F. and (D) an aldehyde-reactive polyhydric phenol, the ratio by weight of A to B being 100 parts of A to 5–2000 parts of B, with the ratio by weight of D to the combined weights of A and B being 2–25 to 100.

13. A solution of (A) ketone-formaldehyde organic reaction product liquid at a temperature below 300° F. and (B) glycidyl ether of a compound selected from the group consisting of polyhydric phenols and polyhydric alcohols, said B having a melting point in the range of 50° C.–160° C. and an expoxide equivalent of 400–5000, said A being such that a 100-gram sample thereof when maintained at 150° C. under reduced pressure of 40 mm. of mercury pressure, a residue remains, said residue being undistillable under said temperature and pressure conditions and measuring at least 60 grams, the ratio by weight of A to B being 100 parts of A to 5–2000 parts of B.

14. A solution defined in claim 13, with the ketone being mesityl oxide.

15. A solution defined in claim 13 dissolved in an organic solvent.

16. A base carrying a solution defined in claim 13, converted to the substantially solid and infusible state.

17. A solution of (A) ketone-formaldehyde organic reaction product liquid at a temperature below 300° F., (B) glycidyl ether of a compound selected from the group consisting of polyhydric phenols and polyhydric alcohols, said B having a melting point in the range of 50° C.–160° C. and an epoxide equivalent of 400–5000, and (C) a thermosetting phenol-aldehyde resin, said A being such that a 100-gram sample thereof when maintained at 150° C. under reduced pressure of 40 mm. of mercury pressure, a residue remains, said residue being undistillable under said temperature and pressure conditions and measuring at least 60 grams, the ratio by weight of A to B being 100 parts of A to 5–2000 parts of B, the ratio by weight of C to the combined weights of A and B being 5–50 to 100.

18. A solution of (A) ketone-formaldehyde organic reaction product liquid at a temperature below 300° F., (B) glycidyl ether of a compound selected from the group consisting of polyhydric phenols and polyhydric alcohols, said B having a melting point in the range of 50° C.–160° C. and an epoxide equivalent of 400–5000, and (D) an aldehyde-reactive polyhydric phenol, said A being such that a 100-gram sample thereof when maintained at 150° C. under reduced pressure of 40 mm. of mercury pressure, a residue remains, said residue being undistillable under said temperature and pressure conditions and measuring at least 60 grams, the ratio by weight of A to B being 100 parts of A to 5–2000 parts of B, the ratio by weight of D to the combined weights of A and B being 2–25 to 100.

19. A novel composition of matter comprising (1) glycidyl ether of a compound selected from the group consisting of polyhydric phenols and polyhydric alcohols intimately combined with (2) organic reaction product liquid at a temperature below 210° C. and produced by heat reacting (a) a monocarboxylic fatty acid having a maximum of 24 carbon atoms with (b) a ketone-formaldehyde organic reaction product, said 1 being liquid at a temperature below 350° F. and said b being liquid at a temperature below 300° F., the ratio by weight of 2 to 1 being 100 parts of 2 to 5–2000 parts of 1.

20. A novel composition of matter comprising (1) glycidyl ether of a compound selected from the group consisting of polyhydric phenols and polyhydric alcohols intimately combined with (2) unsaturated fatty oil modified organic reaction product liquid at a temperature below 210° C. and produced by heat combining 10–100 parts by weight of said oil with 100 parts by weight of an organic mass produced by heat reacting (a) a monocarboxylic fatty acid having a maximum of 24 carbon atoms and (b) a ketone-formaldehyde organic reaction product, said 1 being liquid at a temperature below 350° F. and said b being liquid at a temperature below 300° F., the ratio by weight of 2 to 1 being 100 parts of 2 to 5–2000 parts of 1.

21. A novel composition of matter comprising (1) glycidyl ether of a compound selected from the group consisting of polyhydric phenols and polyhydric alcohols intimately combined with (2) organic reaction product liquid at a temperature below 210° C. and produced by heat reacting (a) an unsaturated monocarboxylic fatty acid of 12–24 carbon atoms with (b) a ketone-formaldehyde organic reaction product, said 1 being liquid at a temperature below 350° F. and said b being liquid at a temperature below 300° F., the ratio by weight of 2 to 1 being 100 parts of 2 to 5–2000 parts of 1.

22. A novel composition of matter comprising (1) glycidyl ether of a compound selected from the group consisting of polyhydric phenols and polyhydric alcohols intimately combined with (2) unsaturated fatty oil modified organic reaction product liquid at a temperature below 210° C. produced by heat combining 10–100 parts by weight of said oil with 100 parts by weight of an organic mass produced by heat reacting (a) a monocarboxylic unsaturated fatty acid of 12–24 carbon atoms with (b) a ketone-formaldehyde organic reaction product, said 1 being liquid at a temperature below 350° F. and said b being liquid at a temperature below 300° F., the ratio by weight of 2 to 1 being 100 parts of 2 to 5–2000 parts of 1.

No references cited.